US012746836B2

(12) United States Patent
Prasad et al.

(10) Patent No.: US 12,746,836 B2
(45) Date of Patent: Sep. 29, 2026

(54) MULTI-FUNCTION ELECTRIC DRIVE SYSTEM WITH INCREASED POWER CAPABILITY

(71) Applicant: GM Global Technology Operations LLC, Detroit, MI (US)

(72) Inventors: Rashmi Prasad, Troy, MI (US); Minh-Khai Nguyen, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 749 days.

(21) Appl. No.: 18/185,162

(22) Filed: Mar. 16, 2023

(65) Prior Publication Data

US 2024/0308379 A1 Sep. 19, 2024

(51) Int. Cl.
*B60L 53/24* (2019.01)
*B60L 53/62* (2019.01)
*B60L 53/63* (2019.01)
*B60L 50/60* (2019.01)

(52) U.S. Cl.
CPC ............... *B60L 53/24* (2019.02); *B60L 53/62* (2019.02); *B60L 53/63* (2019.02); *B60L 50/60* (2019.02); *B60L 2240/547* (2013.01)

(58) Field of Classification Search
CPC ....................................................... B60L 53/24
USPC ......................................................... 320/137
See application file for complete search history.

(56) References Cited

U.S. PATENT DOCUMENTS

2010/0096926 A1* 4/2010 King ....................... B60L 53/20 307/45
2012/0007552 A1* 1/2012 Song ......................... B60L 7/14 320/109
2013/0147431 A1* 6/2013 Lim .......................... H02J 7/02 320/109
2019/0092180 A1* 3/2019 Zhu ......................... B60L 50/51

FOREIGN PATENT DOCUMENTS

CN 112440766 A * 3/2021 .............. B60L 53/00
CN 113541564 A * 10/2021 ............ H02J 7/0029
KR 20240122236 A * 8/2024 .......... H02M 7/5387

* cited by examiner

*Primary Examiner* — Jerry D Robbins
(74) *Attorney, Agent, or Firm* — CANTOR COLBURN LLP

(57) ABSTRACT

A vehicle, system and method of charging the vehicle. The vehicle includes a battery, a first electric motor coupled to the battery, a second electric motor coupled to the battery, and a switch for forming a circuit between a charging station and the battery through the first electric motor and the second electric motor. A processor controls a configuration of the switch and commences charging of the battery from the charging station through the first electric motor and the second electric motor.

20 Claims, 6 Drawing Sheets

MULTI-FUNCTION ELECTRIC DRIVE SYSTEM WITH INCREASED POWER CAPABILITY

INTRODUCTION

The subject disclosure relates to charging a battery at an electric vehicle and, in particular, to a method for charging the battery using a dual electric motor configuration.

Currently existing charging stations have an upper limit to their charging capacity. Electric vehicles are being manufactured which use increasingly higher levels of battery capacity and thus are using batteries with capacities that exceed the charging capacity of current charging stations. Replacing the charging stations with higher-capacity charging stations takes time and cost. Accordingly, it is desirable to provide a system and method for charging a battery of a vehicle that has a higher capacity than a charging station.

SUMMARY

In one exemplary embodiment, a method of charging a vehicle is disclosed. A circuit is formed between a charging station and a battery of the vehicle through a first electric motor of the vehicle and a second electric motor of the vehicle. The battery is charged from the charging station through the first electric motor and the second electric motor.

In addition to one or more of the features described herein, the method further includes forming the circuit when a charging voltage level at the charging station is less than a battery voltage level at the battery. The method further includes forming a direct charging circuit between the charging station and the battery when a charging voltage level at the charging station is greater than a battery voltage level at the battery. The method further includes interleaving a first phase of the first electric motor with a second phase of the second electric motor to reduce a ripple in a charging current at the battery. Interleaving the first phase and the second phase further includes operating the first electric motor and the second electric motor in one of a four-phase interleaved mode and a six-phase interleaved mode. The method further includes placing a d-axis of a rotor of the first electric motor close to an inactive winding of the first electric motor. The method further includes adjusting a ramp cycle to distribute power to the first electric motor and the second electric motor proportionate to a first power capacity of the first electric motor and a second power capacity of the second electric motor.

In another exemplary embodiment, a system for charging a battery of a vehicle is disclosed. The system includes a first electric motor coupled to the battery, a second electric motor coupled to the battery, a switch for forming a circuit between a charging station and the battery through the first electric motor and the second electric motor, and a processor. The processor is configured to control a configuration of the switch and commence charging of the battery from the charging station through the first electric motor and the second electric motor.

In addition to one or more of the features described herein, the processor is further configured to form the circuit when a charging voltage level at the charging station is less than a battery voltage level at the battery. The processor is further configured to form a direct charging circuit between the charging station and the battery when a charging voltage level at the charging station is greater than a battery voltage level at the battery. The processor is further configured to interleave a first phase of the first electric motor with a second phase of the second electric motor to reduce a ripple in a charging current at the battery. Interleaving the first phase and the second phase further comprises operating the first electric motor and the second electric motor in one of a four-phase interleaved mode and a six-phase interleaved mode. The processor is further configured to place a d-axis of a rotor of the first electric motor close to an inactive winding of the first electric motor. The processor is further configured to adjust a ramp cycle to distribute power to the first electric motor and the second electric motor proportionate to a first power capacity of the first electric motor and a second power capacity of the second electric motor.

In another exemplary embodiment, a vehicle is disclosed. The vehicle includes a battery, a first electric motor coupled to the battery, a second electric motor coupled to the battery, a switch for forming a circuit between a charging station and the battery through the first electric motor and the second electric motor, and a processor. The processor is configured to control a configuration of the switch and commence charging of the battery from the charging station through the first electric motor and the second electric motor.

In addition to one or more of the features described herein, the processor is further configured to form the circuit when a charging voltage level at the charging station is less than a battery voltage level at the battery. The processor is further configured to form a direct charging circuit between the charging station and the battery when a charging voltage level at the charging station is greater than a battery voltage level at the battery. The processor is further configured to interleave a first phase of the first electric motor with a second phase of the second electric motor to reduce a ripple in a charging current at the battery. The processor is further configured to place a d-axis of a rotor of the first electric motor close to an inactive winding of the first electric motor. The processor is further configured to adjust a ramp cycle to distribute power to the first electric motor and the second electric motor proportionate to a first power capacity of the first electric motor and a second power capacity of the second electric motor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
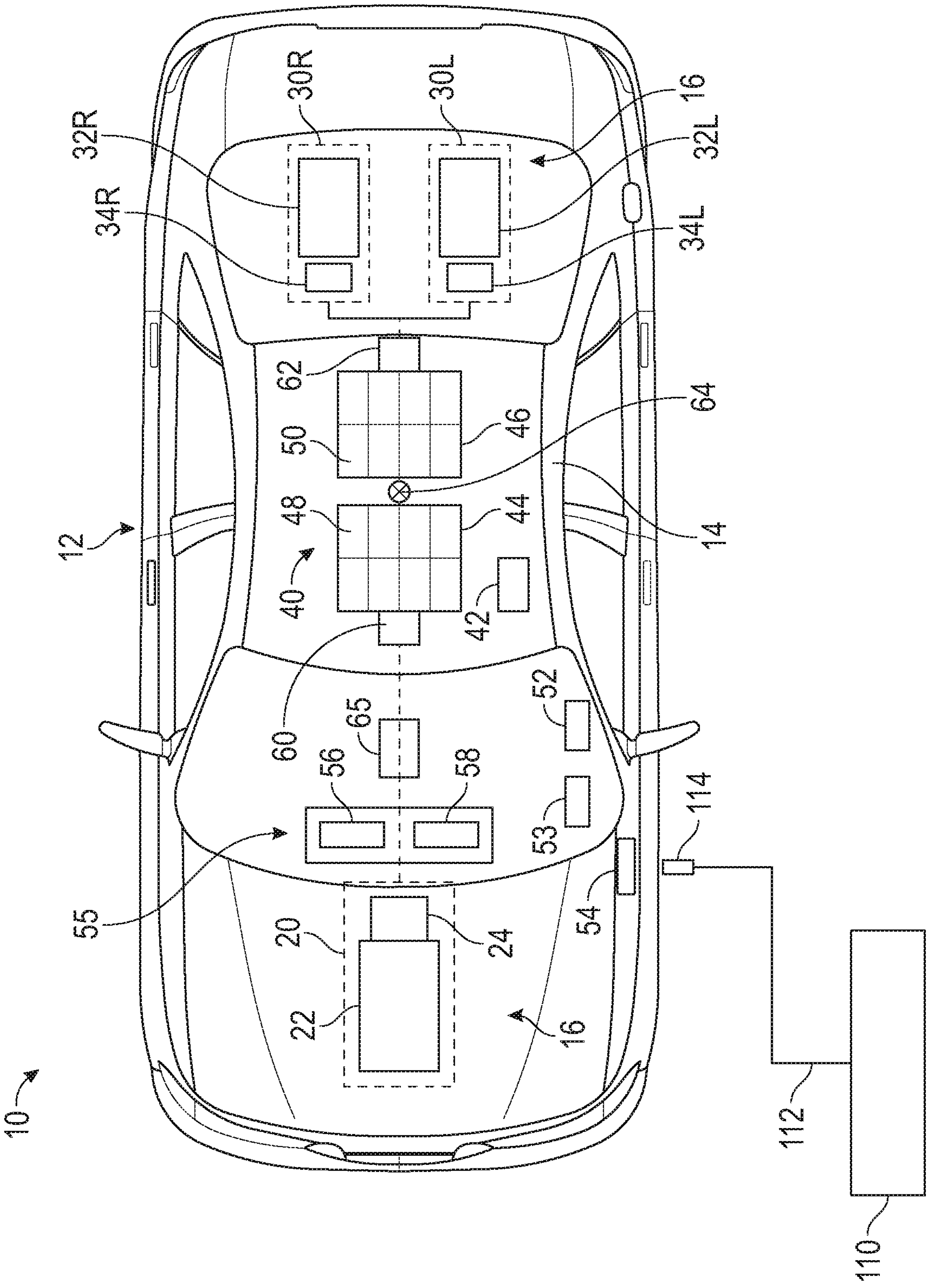
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes an electric motor 32L and an inverter 34L. A right rear drive unit 30R includes an electric motor 32R and an inverter 34R. The inverters 24, 34L and 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 and rear electric motors 32L and 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives front wheels (not shown) and the rear electric motors 32L and 32R drive rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each battery module 48, 50 includes a number of individual cells (not shown). In various embodiments, one or more of the battery packs can include a MODACS (Multiple Output Dynamically Adjustable Capacity) battery, as described herein with respect to FIGS. 2-4.

Each of the front electric motor 22 and the rear electric motors 32L and 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the battery packs 44 and 46, and selectively connecting the battery packs 44 and 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects the first battery pack 44 to the inverters 24, 34L and 34R, and a second switching device 62 that selectively connects the second battery pack 46 to the inverters 24, 34L and 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller includes any suitable processing device or unit and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

The vehicle 10 is shown parked adjacent to a charging station 110. The charging station 110 includes a charging host 112 that can extend from the charging station to the vehicle 10 and a charge plug 114 that can be inserted into the charge port 54.

Figure 2:
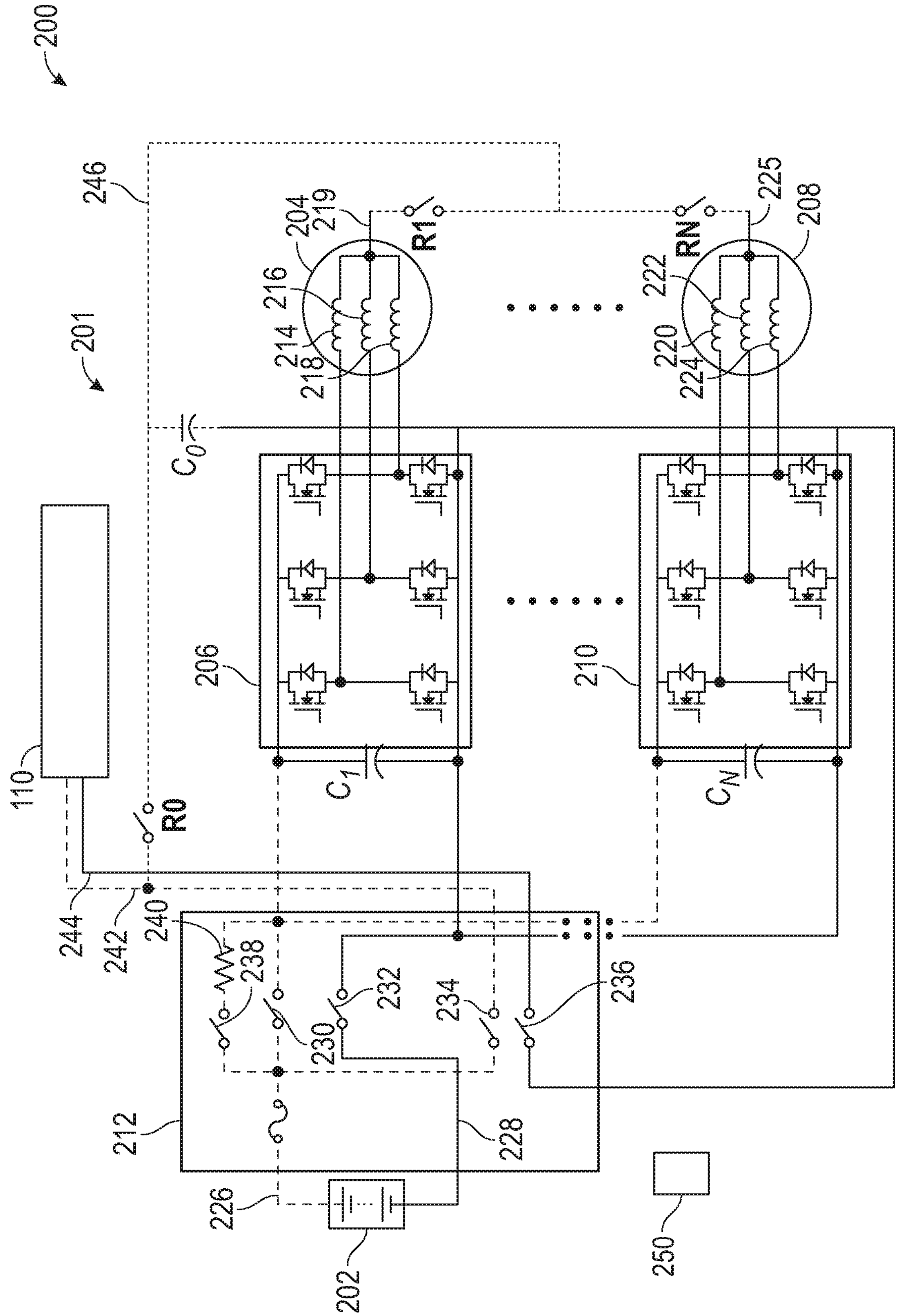
FIG. 2 is a schematic diagram of an electric drive system of the electric vehicle of FIG. 1 with four-terminal motors, in an illustrative embodiment.

FIG. 2 is a schematic diagram 200 of an electric drive system 201 of the electric vehicle 100 of FIG. 1 with four-terminal motors, in an illustrative embodiment. In various embodiments, the electric drive system 201 can include a battery, such as the front battery pack 44 and some or all of the front drive unit 20, left rear drive unit 30L or the right rear drive unit 30R.

The electric drive system 201 includes a power source or battery 202, a first electric motor 204, a first inverter 206 associated with the first electric motor, a second electric motor 208, and a second inverter 210 associated with the second electric motor. The first electric motor 204 and the second electric motor 208 are four-terminal machines with three windings and a neutral point. The electric drive system 201 is shown having multiple (N) motors and inverters. However, for ease of illustration, the electric system and its operation are discussed herein by referring to two motors and two inverters.

The first electric motor 204 is a three-phase motor having a first A winding 214, first B winding 216, first C winding 218 and a first neutral point 219. The first inverter 206 is coupled between the first electric motor 204 and the battery 202 and includes various field effect transistors (FETs) that control the phase relation of currents in the first A winding 214, first B winding 216 and first C winding 218. Similarly, the second electric motor 208 is a three-phase motor having a second A winding 220, second B winding 222, second C winding 224, and a second neutral point 225. The second inverter 210 is coupled between the second electric motor 208 and the battery 202 and includes various FETs that control the phase relation of currents in the second A winding 220, second B winding 222 and second C winding 224.

A battery disconnect unit (BDU 212) controls a connection between the battery 202 and each of the first inverter 206 and the second inverter 210. The BDU 212 includes a plurality of switches or contactors that can be configured for various operational modes of the electric vehicle 100, such as a normal mode of operation, a first (standard) charging mode for charging the vehicle, and a second (increased power) charging mode for charging the vehicle. A positive battery line 226 provides a connection through the BDU 212 between a positive end of the battery 202 and positive ends of the first inverter 206 and the second inverter 210. A negative battery line 228 provides a connection through the BDU 212 between a negative end of the battery 202 and negative ends of the first inverter 206 and the second inverter 210. A positive bus main switch 230 is located along positive battery line 226 and a negative bus main switch 232 is located along negative battery line 228. During the normal mode of operation, the positive bus main switch 230 and negative bus main switch 232 are closed to allow the battery to provide power to the first electric motor 204 and/or the second electric motor 208. During either a standard charging mode or a second charging mode, the positive bus main switch 230 is opened to open the circuit between the battery 202 and the first inverter 206 and the second inverter 210. The negative bus main switch 232 is kept closed during the charging modes.

A controller 250 controls operation of the electric system. The controller 250 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 250 may include a non-transitory computer-readable medium that stores instructions which, when processed by one or more processors of the controller 250, implement a method of controlling a charging operation at the electric vehicle 100 according to one or more embodiments detailed herein.

The charging station 110 can be connected to the electric drive system 201 through a positive DCFC bus 242 (positive direct current fast charging bus) and a negative DCFC bus 244. The positive DCFC bus 242 and the negative DCFC bus 244 connect to the battery through the BDU 212. The BDU 212 includes a positive DCFC switch 234 and a negative DCFC switch 236. The positive DCFC switch 234 can be closed to connect the positive DCFC bus 242 to the positive battery line 226. The negative DCFC switch 236 and the negative bus main switch 232 can be closed to create a connection between the negative DCFC bus 244 and the negative battery line 228 (via the first inverter 206 and/or the second inverter 210).

The BDU 212 also includes a pre-charge switch 238 that can be open during normal operation of the electric vehicle 100 and can be closed prior to charging the battery 202. Closing the pre-charge switch 238 brings a pre-charge resistor 240 into the circuit. The pre-charge resistor 240 can be used to prevent inrush current.

The positive DCFC bus 242 includes a back end branch 246 that connects to the first neutral point 219 of the first electric motor 204 and the second neutral point 225 of the second electric motor 208. A branch switch R0 controls a connection between the back end branch 246 and the positive DCFC bus 242. Branch switch R1 controls a connection between the back end branch 246 and first neutral point 219. Branch switch RN controls a connection between the back end branch 246 and second neutral point 225.

Figure 3:
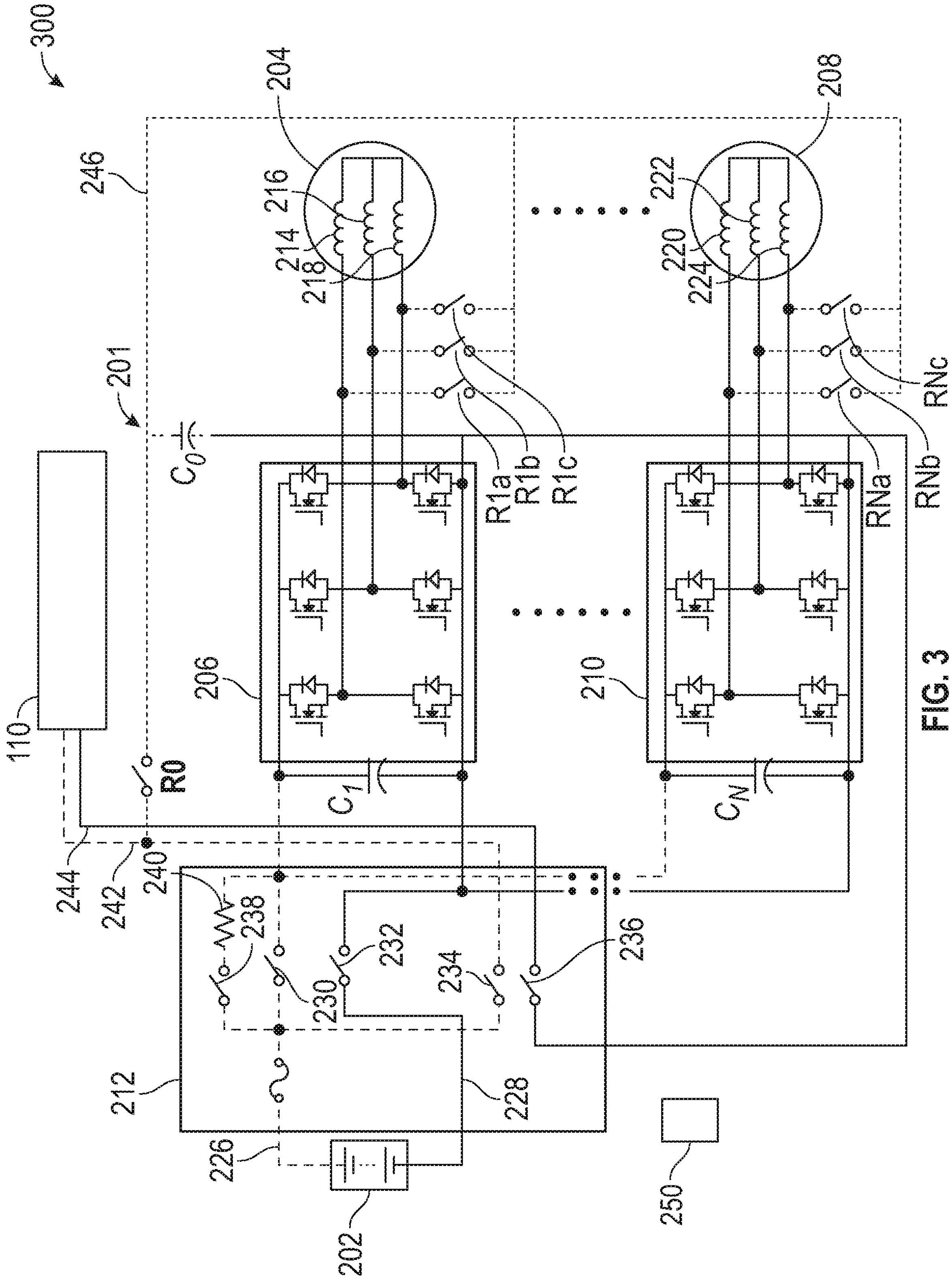
FIG. 3 is a schematic diagram of the electric drive system of the electric vehicle with three-terminal motors, in an alternative embodiment.

FIG. 3 is a schematic diagram 300 of the electric drive system 201 of the electric vehicle 100 with three-terminal motors, in an alternative embodiment. In the alternative embodiment, the back end branch 246 connects the positive DCFC bus 242 to the lines between the first inverter 206 and the first electric motor 204 as well as to the lines between the second inverter 210 and the second electric motor 208. Branch switch R0 can be closed or opened to control the connection between the back end branch 246 and the positive DCFC bus 242. Winding switches or winding contactors R1*a*, R1*b* and R1*c* control individual connections between the back end branch 246 and the first A winding 214, first B winding 216 and first C winding 218, respectively. Similarly, winding switches or winder contactors RNa, RNb and RNc control individual connections between the back end branch 246 and the second A winding 220, second B winding 222 and second C winding 224, respectively. The winding contactors R1*a*, R1*b* and R1*c* can be selectively opened or closed for charging through the first electric motor 204 based on a position of a rotor of the first electric motor. The winding contactors RNa, RNb and RNc can be selectively opened or closed for charging through the second electric motor 208 based on a position of a rotor of the second electric motor.

Figure 4:
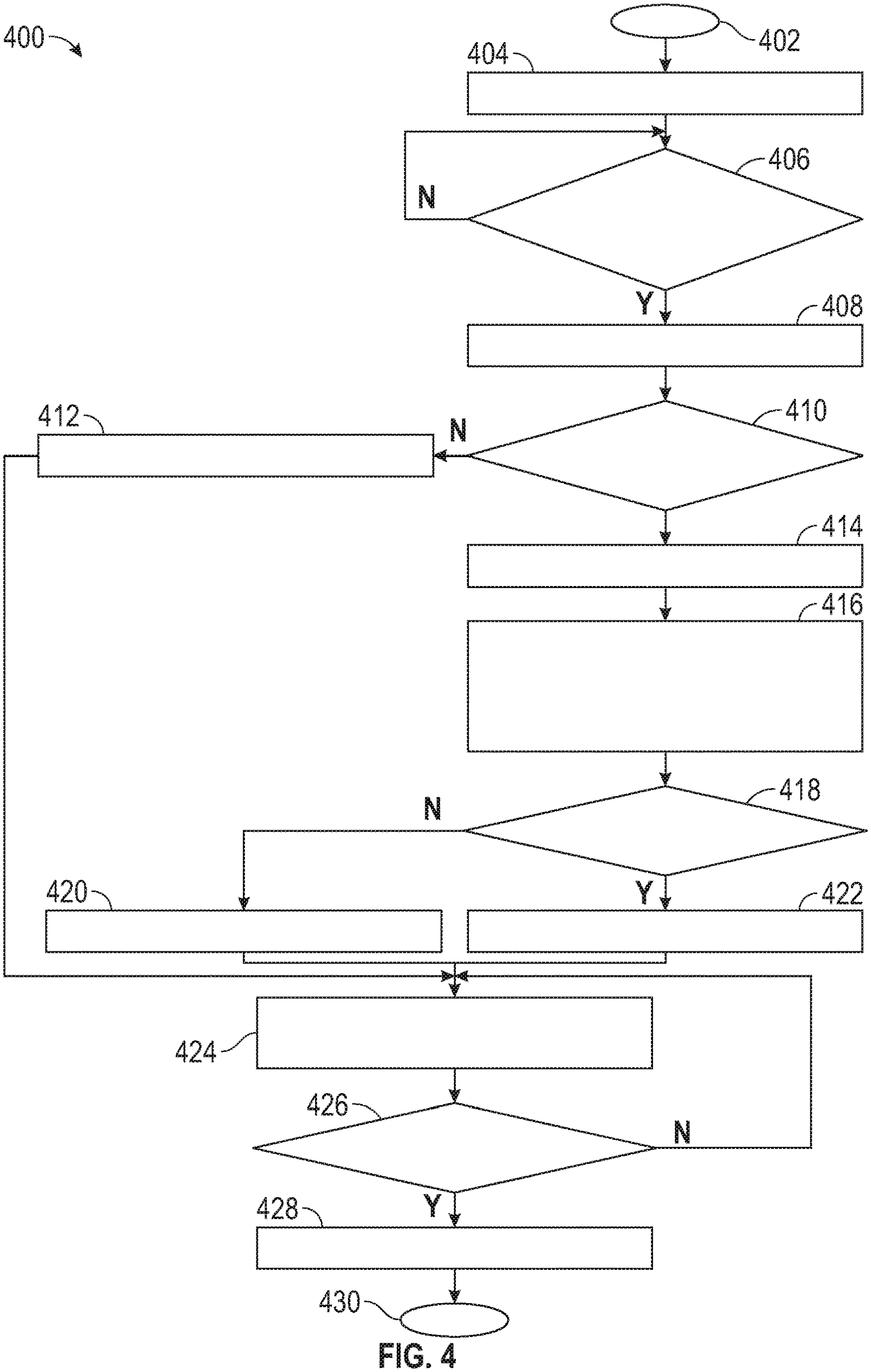
FIG. 4 shows a flowchart of a method for charging the electric vehicle in an illustrative embodiment.

FIG. 4 shows a flowchart 400 of a method for charging the electric vehicle 100 in an illustrative embodiment. The method begins at box 402 with the electric vehicle 100 under normal operation. The positive bus main switch 230 and the negative bus main switch 232 are closed. All other switches (i.e., positive DCFC switch 234, negative DCFC switch 236, pre-charge switch 238 and switches Ri, i=1, . . . , N) are open. At box 404, the vehicle is stopped and turned off. Turning off the vehicle includes opening the positive bus main switch 230 and the negative bus main switch 232. At this point, the driver gets out of the vehicle and inserts the plug into the charge port. At box 406, the controller 250 checks to see if the plug has been inserted into the charge port and that a handshaking protocol has been performed. Box 406 loops back into itself until insertion and handshaking has been completed. Once this is completed, the method proceeds to box 408. In box 408, the charging voltage from the charging station is read. In box 410, the charging voltage is compared to the battery voltage. If the charging voltage is greater than or equal to the battery voltage, the method proceeds to box 412. Otherwise, the method proceeds to box 414.

Referring first to box 412, the positive DCFC switch 234 and the negative DCFC switch 236 are closed. The branch switches (switches Rj (j=0, . . . , N)) are maintained in an open configuration. In this switch configuration, the battery is set up for standard charging via a direct connection between the battery 202 and the charging station 110. The method then proceeds to box 424, at which the standard charging is commenced. In box 424, the controller 250 provides a command to the charging station 110 to allow the charging station to commence charging. In box 426, the controller 250 monitors the charging state of the battery 202. If the charging is not complete (i.e., the battery's charge is less that a charging threshold), the method loops back to box 424. If the charging is complete (i.e., the battery's charge is greater than or equal to the charging threshold), the method proceeds to box 428. In box 428, all of the switches are opened. In box 430, the method ends.

Referring now to box 414, the positive DCFC switch 234 and the negative DCFC switch 236, as well as the branch switches (Rj (j=0, . . . , N)) are closed. In box 416, the pre-charge switch 238 is closed and the controller 250 checks for a pre-charge voltage across the pre-charge resistor 240 and a ramp duty cycle. Once the pre-charge voltage reaches a voltage threshold and the ramp duty cycle meets a predetermined threshold, the method proceeds to box 418. When the first electric motor 204 and the second electric motor 208 have dissimilar power capacities, the ramp duty cycle can be adjusted to distribute power to each motor proportionate to their power capacities.

In box 418, the charging power is compared to a power threshold. If the charging power is less than the power threshold, the method proceeds to box 420. Otherwise, the method proceeds to box 422. In box 420, the winding switches R1*a*, R1*b*, R1C) of the first electric motor 204 are configured for a four-phase interleaved charging as are the winding switches (RNa, RNb, RNc) of the second electric motor 208. For the first electric motor 204, one of the winding switches R1*a*, R1*b*, and R1*c* is closed and two are left open (e.g., switch R1*a* is closed and switches R1*b* and R1*c* are open). Also, for the second electric motor 208, one of the winding switches RNa, RNb, and RNc is closed and two are left open (e.g., switches RNa is closed and switches RNb and RNc are open). For each motor, the d-axis of the rotor can be placed in a position that closest to the axis of the inactive phase.

Referring now to box 422, the winding switches are configured for six-phase interleaved charging. In the six-phase interleaved charging configuration, all of the winding switches at each motor are closed. It is noted that box 422 is the only option available for the electric drive system having 4-terminal motors, as shown in FIG. 2.

From either box 420 of box 422 (with the switches configured as desired), the method proceeds to box 424 for charging.

Figure 5:
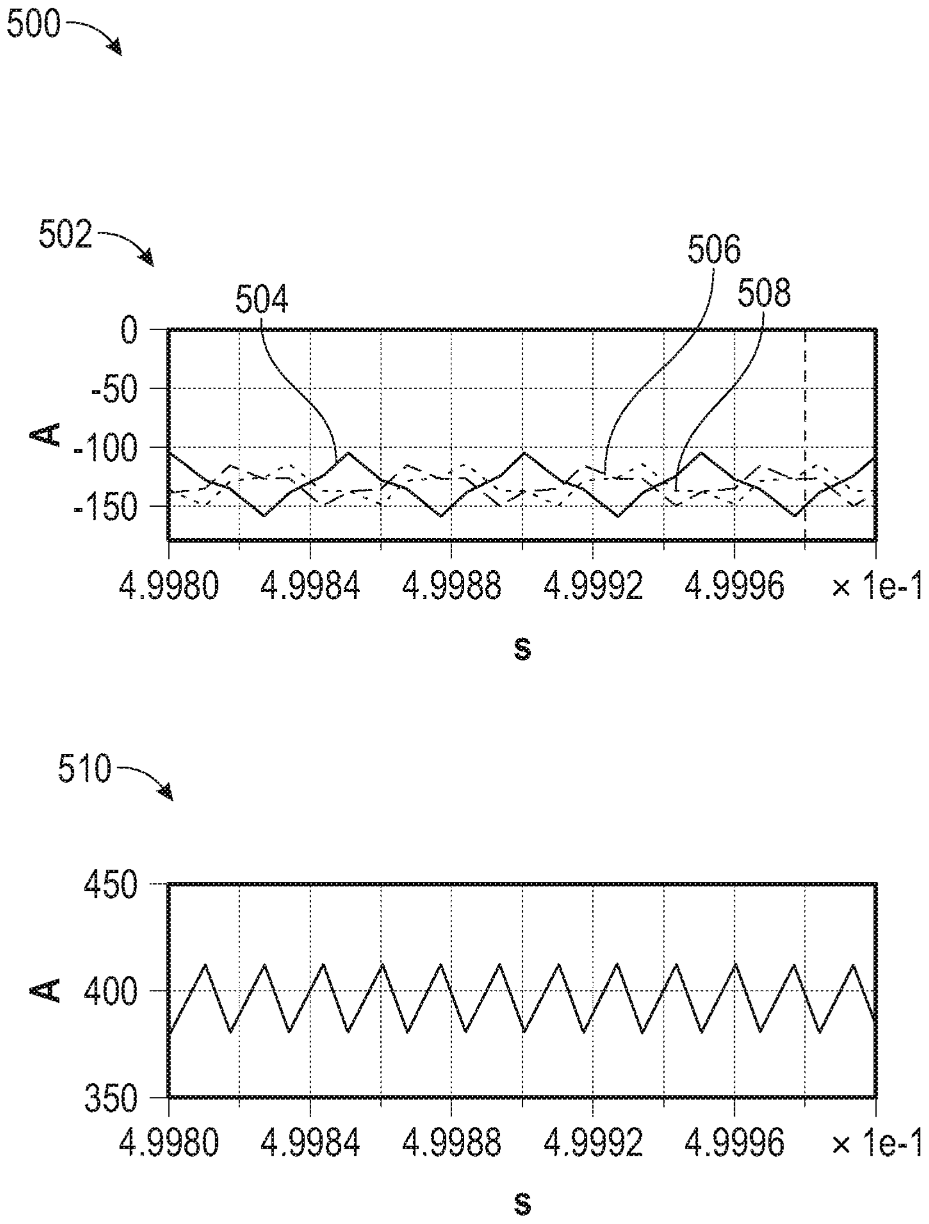
FIG. 5 shows graphs illustrating current output from charging the battery using a single motor.

FIG. 5 shows graphs 500 illustrating current output from charging the battery 202 using a single motor. Graph 502 shows winding currents $I_A$ 504, $I_B$ 506, and $I_C$ 508 for each of the windings 214, 216 and 218, respectively. Graph 510 shows an average of the winding currents. The average current is about 400 Amps, with a peak-to-peak variation of about 30 Amps.

Figure 6:
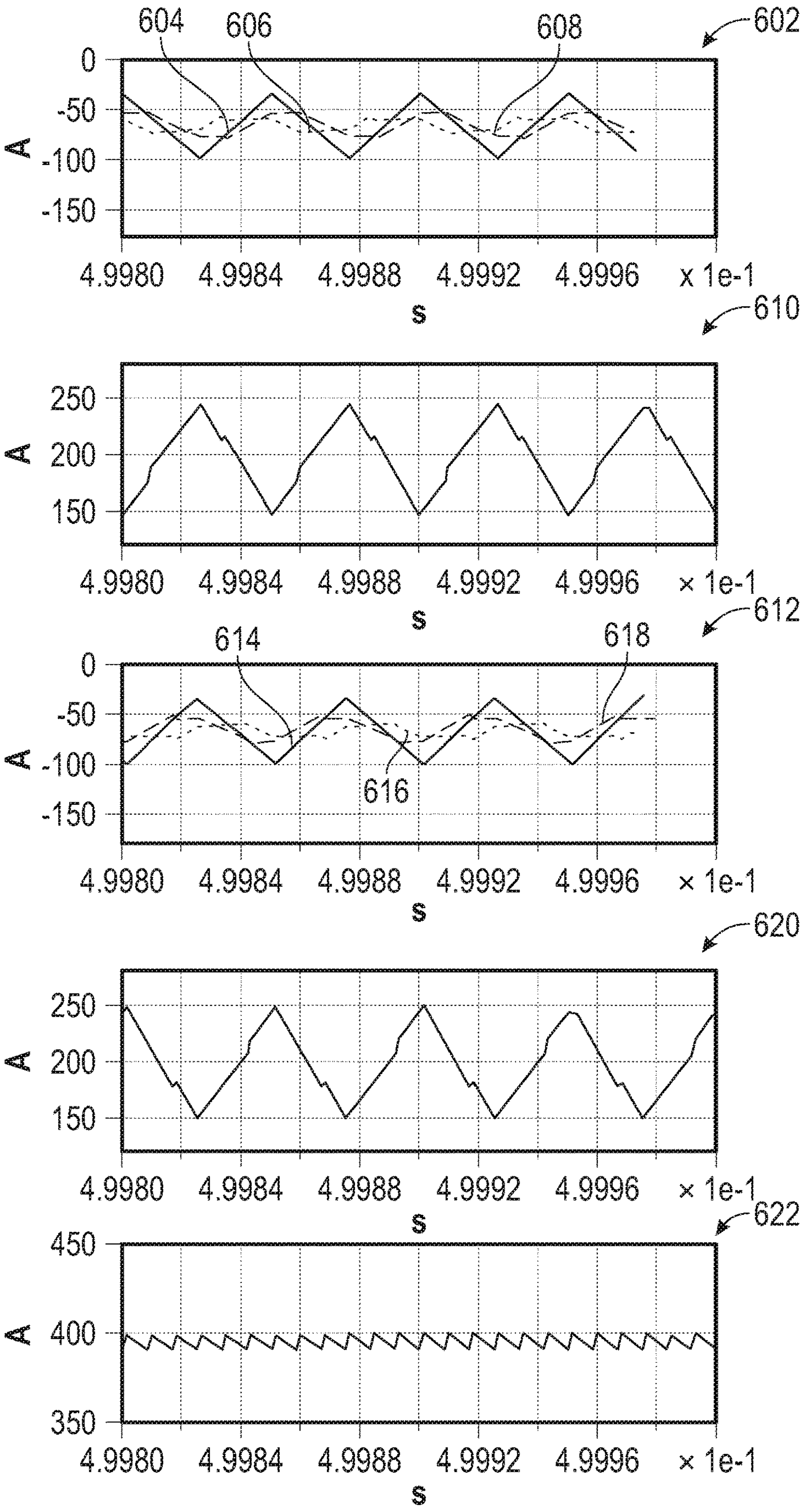
FIG. 6 shows graphs illustrating current during charging using a dual motor configuration.

FIG. 6 shows graphs illustrating current during charging using a dual motor configuration. Graph 602 shows winding currents $I_A$ 604, $I_B$ 606, and $I_C$ 608 for each of the windings 214, 216 and 218, respectively, of the first electric motor 204. Graph 610 shows an average of the winding currents for the first electric motor 204.

Graph 612 shows winding currents $I_A$ 614, $I_B$ 616, and $I_C$ 618 for each of the windings 220, 222 and 224, respectively, of the second electric motor 208. Graph 620 shows an average of the winding currents for the second electric motor 208. Graph 622 shows the combined current of the first electric motor 204 and the second electric motor 208. The average combined current is about 400 Amps, with a peak-to-peak variation of about 10 Amps which is a smaller variation than the single motor configuration.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of charging a vehicle, comprising:

forming a circuit between a charging station and a battery of the vehicle through a first electric motor of the vehicle and a second electric motor of the vehicle, wherein forming the circuit includes connecting the first electric motor of the vehicle to a battery disconnect unit via a first inverter and the second electric motor of the vehicle to the battery disconnect unit via a second inverter, wherein the battery disconnect unit includes a plurality of switches able to be configured in any one of a plurality of operational modes including a normal mode of operation, a first (standard) charging mode, and a second (increased power) charging mode, and wherein the plurality of switches in the battery disconnect unit can be reconfigured from any one of the plurality of operational modes to any other one of the plurality of operational modes; and charging the battery from the charging station through the first electric motor and the second electric motor.

2. The method of claim 1, further comprising forming the circuit when a charging voltage level at the charging station is less than a battery voltage level at the battery.

3. The method of claim 1, further comprising forming a direct charging circuit between the charging station and the battery when a charging voltage level at the charging station is greater than a battery voltage level at the battery.

4. The method of claim 1, further comprising interleaving a first phase of the first electric motor with a second phase of the second electric motor to reduce a ripple in a charging current at the battery.

5. The method of claim 4, wherein interleaving the first phase and the second phase further comprises operating the first electric motor and the second electric motor in one of: (i) a four phase interleaved mode; and (ii) a six-phase interleaved mode.

6. The method of claim 1, wherein a positive battery line provides a connection through the battery disconnect unit between a positive end of the battery and positive ends of the first inverter and the second inverter, a negative battery line provides a connection through battery disconnect unit between a negative end of the battery and negative ends of the first inverter and the second inverter, a positive bus main switch interrupts the positive battery line and a negative bus main switch interrupts negative battery line; and during the normal mode of operation, the positive bus main switch and negative bus main switch are closed;

during the first (standard) charging mode, and the second (increased power) charging mode, the positive bus main switch is opened the battery and the first inverter and the second inverter, and the negative bus main switch is closed during the first (standard) charging mode, and the second (increased power) charging mode.

7. The method of claim 1, further comprising adjusting a ramp cycle to distribute power to the first electric motor and the second electric motor proportionate to a first power capacity of the first electric motor and a second power capacity of the second electric motor.

8. A system for charging a battery of a vehicle, comprising:

a first electric motor coupled to the battery;

a second electric motor coupled to the battery;

a battery disconnect unit connecting the first electric motor to the battery via a first inverter and the second electric motor to the battery disconnect unit via a second inverter, wherein the battery disconnect unit includes a plurality of switches able to be configured in any one of a plurality of operational modes including a normal mode of operation, a first (standard) charging mode, and a second (increased power) charging mode, and wherein the plurality of switches in the battery disconnect unit can be reconfigured from any one of the plurality of operational modes to any other one of the plurality of operational modes the plurality of switches forming a circuit between a charging station and the battery through the first electric motor and the second electric motor; and a processor configured to:

control a configuration of the switch; and commence charging of the battery from the charging station through the first electric motor and the second electric motor.

9. The system of claim 8, wherein the processor is further configured to form the circuit when a charging voltage level at the charging station is less than a battery voltage level at the battery.

10. The system of claim 8, wherein the processor is further configured to form a direct charging circuit between the charging station and the battery when a charging voltage level at the charging station is greater than a battery voltage level at the battery.

11. The system of claim 8, wherein the processor is further configured to interleave a first phase of the first electric motor with a second phase of the second electric motor to reduce a ripple in a charging current at the battery.

12. The system of claim 11, wherein interleaving the first phase and the second phase further comprises operating the first electric motor and the second electric motor in one of: (i) a four phase interleaved mode; and (ii) a six-phase interleaved mode.

13. The system of claim 8, wherein a positive battery line provides a connection through the battery disconnect unit between a positive end of the battery and positive ends of the first inverter and the second inverter, a negative battery line provides a connection through battery disconnect unit between a negative end of the battery and negative ends of the first inverter and the second inverter, a positive bus main switch interrupts the positive battery line and a negative bus main switch interrupts negative battery line; and during the normal mode of operation, the positive bus main switch and negative bus main switch are closed;

during the first (standard) charging mode, and the second (increased power) charging mode, the positive bus main switch is opened the battery and the first inverter and the second inverter, and the negative bus main switch is closed during the first (standard) charging mode, and the second (increased power) charging mode.

14. The system of claim 8, wherein the processor is further configured to adjust a ramp cycle to distribute power to the first electric motor and the second electric motor proportionate to a first power capacity of the first electric motor and a second power capacity of the second electric motor.

15. A vehicle, comprising:

a battery;

a first electric motor coupled to the battery;

a second electric motor coupled to the battery;

a battery disconnect unit connecting the first electric motor to the battery via a first inverter and the second electric motor to the battery disconnect unit via a second inverter, wherein the battery disconnect unit includes a plurality of switches able to be configured in any one of a plurality of operational modes including a normal mode of operation, a first (standard) charging mode, and a second (increased power) charging mode, and wherein the plurality of switches in the battery disconnect unit can be reconfigured from any one of the plurality of operational modes to any other one of the plurality of operational modes the plurality of switches forming a circuit between a charging station and the battery through the first electric motor and the second electric motor; and a processor configured to:

control a configuration of the plurality of switches; and commence charging of the battery from the charging station through the first electric motor and the second electric motor.

16. The vehicle of claim 15, wherein the processor is further configured to form the circuit when a charging voltage level at the charging station is less than a battery voltage level at the battery.

17. The vehicle of claim 15, wherein the processor is further configured to form a direct charging circuit between the charging station and the battery when a charging voltage level at the charging station is greater than a battery voltage level at the battery.

18. The vehicle of claim 15, wherein the processor is further configured to interleave a first phase of the first electric motor with a second phase of the second electric motor to reduce a ripple in a charging current at the battery.

19. The vehicle of claim 15, wherein a positive battery line provides a connection through the battery disconnect unit between a positive end of the battery and positive ends of the first inverter and the second inverter, a negative battery line provides a connection through battery disconnect unit between a negative end of the battery and negative ends of the first inverter and the second inverter, a positive bus main switch interrupts the positive battery line and a negative bus main switch interrupts negative battery line; and during the normal mode of operation, the positive bus main switch and negative bus main switch are closed;

during the first (standard) charging mode, and the second (increased power) charging mode, the positive bus main switch is opened the battery and the first inverter and the second inverter, and the negative bus main switch is closed during the first (standard) charging mode, and the second (increased power) charging mode.

20. The vehicle of claim 15, wherein the processor is further configured to adjust a ramp cycle to distribute power to the first electric motor and the second electric motor proportionate to a first power capacity of the first electric motor and a second power capacity of the second electric motor.

* * * * *